United States Patent

Moretz et al.

[11] Patent Number: 5,845,749
[45] Date of Patent: Dec. 8, 1998

[54] LINEAR MOTION ABSORBER WITH SYNTHETIC COMPONENTS

[75] Inventors: Ralph D. Moretz, Jackson; William D. Solomon, Grass Lake; Ronald L. Johncox, Clarklake, all of Mich.

[73] Assignee: TMJ Properties, L.L.C., Jackson, Mich.

[21] Appl. No.: 540,780

[22] Filed: Oct. 11, 1995

[51] Int. Cl.⁶ ..................................................... B60R 7/06
[52] U.S. Cl. ........................ 188/281; 267/34; 267/64.11; 267/69; 267/226; 16/67
[58] Field of Search ...................... 188/322.16, 322.17, 188/322.18; 267/34, 64.11, 64.15, 226, 69–74; 16/66, 67, 69, 70, 84

[56] References Cited

U.S. PATENT DOCUMENTS

| | | | |
|---|---|---|---|
| 909,074 | 12/1909 | Flynn | 16/67 |
| 1,204,253 | 11/1916 | Diercks | 267/226 |
| 3,123,351 | 3/1964 | Graber | 267/71 |
| 4,110,868 | 9/1978 | Imazaike | 16/84 |
| 4,382,311 | 5/1983 | Watts | 16/66 |
| 4,483,044 | 11/1984 | Johnston et al. | 16/70 |
| 4,681,303 | 7/1987 | Grassano | 267/72 |
| 4,792,127 | 12/1988 | Körtgen | 188/322.16 |
| 4,856,625 | 8/1989 | Oshida | 188/282 |
| 5,333,845 | 8/1994 | Seiichi | 267/70 |

Primary Examiner—Matthew C. Graham
Attorney, Agent, or Firm—Young & Basile, P.C.

[57] ABSTRACT

A linear motion absorber for damping linear movement utilizing a cylinder having a reciprocal piston located therein. The cylinder and piston are molded of synthetic plastic and the piston is of an extended length and a diameter slightly less than the inner diameter of the cylinder as to be self aligning therewith and includes a homogeneous annular lip seal to produce unidirectional sealing. The piston stem or rod is also of a synthetic plastic material and in the rigid stem embodiment homogeneously extends from the piston. The piston rod may also consist of a flexible synthetic strand attached to the piston for transmitting tension forces, and a compression spring within the cylinder acting upon the piston will position the piston to a retracted position. The open end of the cylinder is sealed by a removable cap entirely formed of a synthetic plastic material which may be readily affixed to the cylinder to produce a closed circuit during damping.

19 Claims, 3 Drawing Sheets

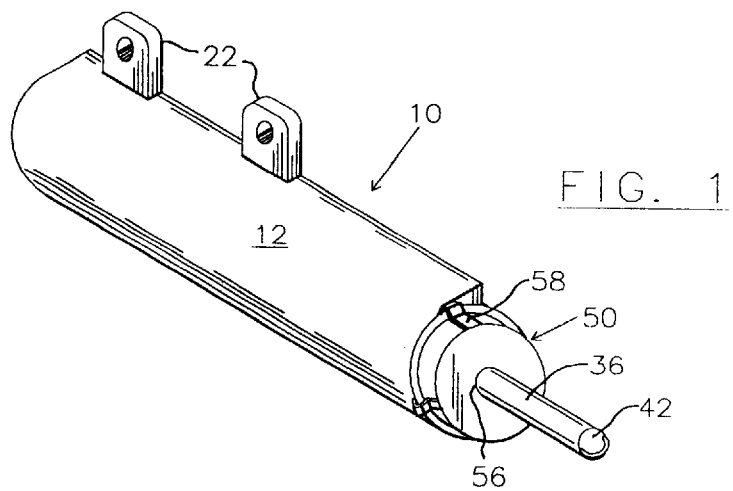
FIG. 1
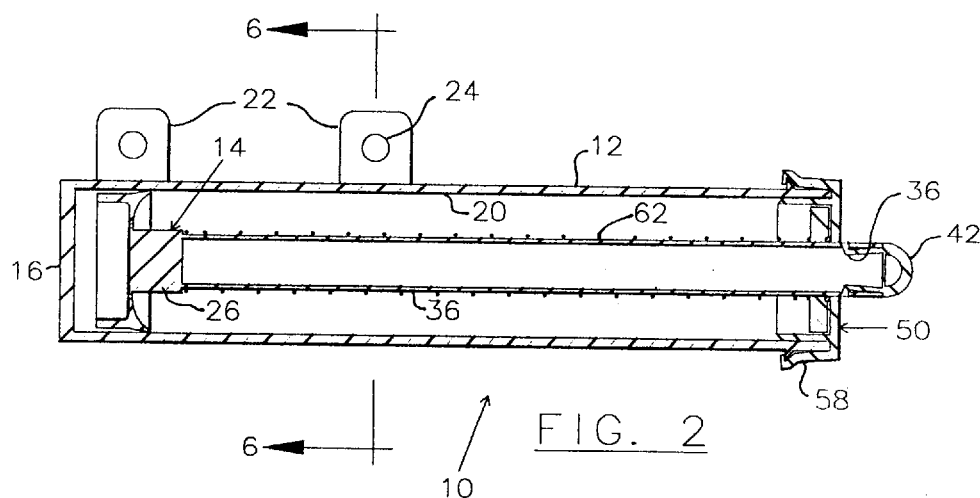
FIG. 2
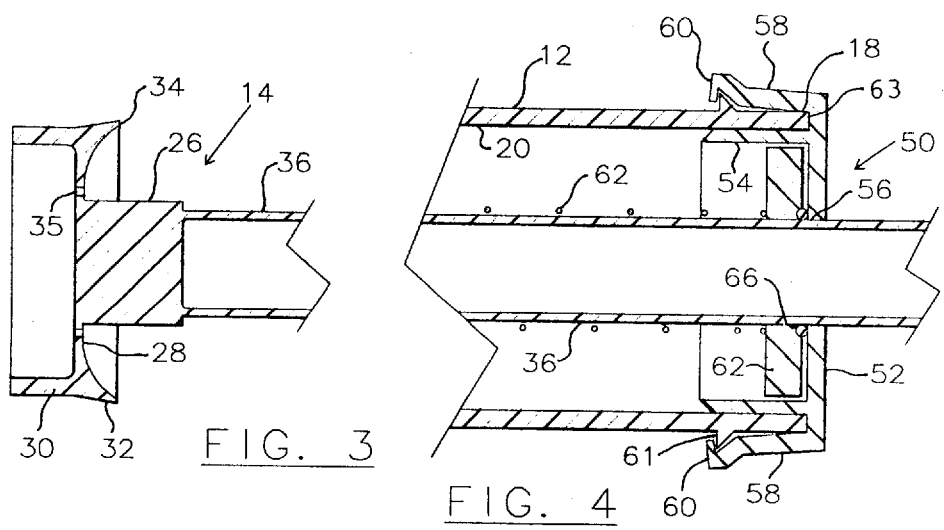
FIG. 3
FIG. 4

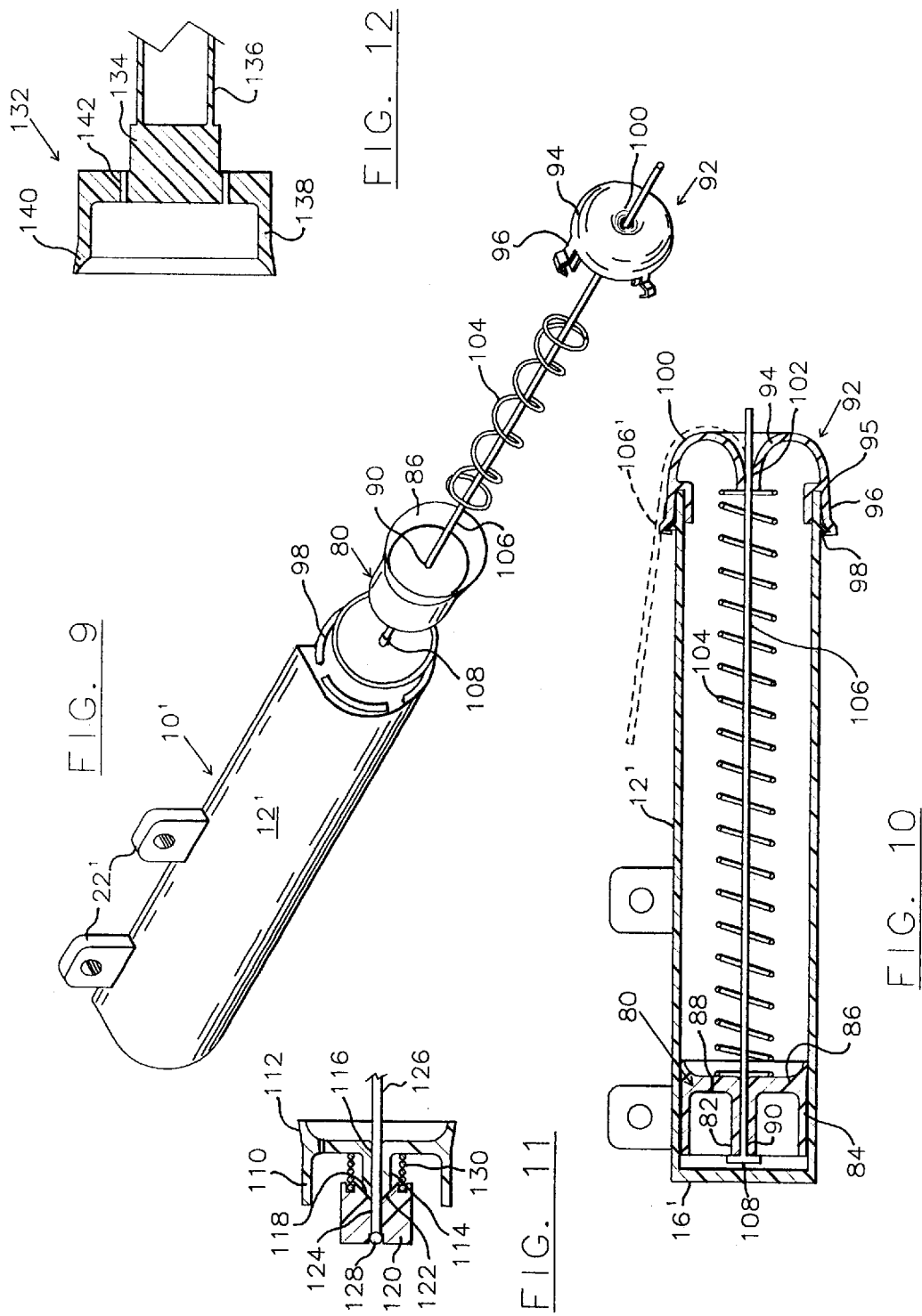

LINEAR MOTION ABSORBER WITH SYNTHETIC COMPONENTS

BACKGROUND OF THE INVENTION

1. Field of the Invention

The invention pertains to damped linear motion absorbers substantially entirely formed of a synthetic plastic material wherein the piston utilizes a homogeneous unidirectional seal and the construction costs are substantially less than competitive comparable motion absorbers.

2. Description of the Related Art

Linear motion absorbers or dashpots basically comprise expansible chamber devices utilizing a reciprocal piston within an elongated cylinder. The rate of movement of the piston through the cylinder is determined by the rate of fluid flow through the piston, or circumventing about the piston, and such devices are dependable in operation and have long been used to damp linear motion, absorb linear vibration and control the rate of movement of components to which the absorber piston is attached. Such expansible chamber devices take a wide variety of forms, and it is known to construct the piston and cylinder of such devices of synthetic plastic materials such as shown in U.S. Pat. No. 4,856,625. It is also known in such devices to employ pistons having molded seal portions such as shown in U.S. Pat. No. 4,110,868.

Previous dampers for linear motion absorption are of relatively high manufacturing cost, and considerable effort has been expended to reduce the cost of such devices, particularly when used with such high production applications as an automobile glove box wherein the motion absorber is used to damp the opening of a heavy storage compartment door.

OBJECTS OF THE INVENTION

It is an object of the invention to provide a damped linear motion absorber of the expansible chamber type having a cylinder and piston wherein the primary components are molded of a synthetic plastic material and the motion absorber is not subject to corrosion, moisture, and may be manufactured at a low cost.

A further object of the invention is to provide a damped linear motion absorber formed of synthetic plastic material wherein a piston reciprocates within a cylinder, and the piston is molded of a synthetic plastic material having a lip seal homogeneously formed of the piston material for producing a sealed relationship between the piston and the cylinder in which it is received during specific directional piston movement therein.

A further object of the invention is to provide a damped linear motion absorber of the expansible chamber type wherein a reciprocal piston is located within a cylinder and a bleed passage permits fluid flow through the piston, the bleed passage in one embodiment being capable of varying in cross sectional area dependent upon the pressure of the fluid within the passage wherein under higher pressures the area of the bleed passage automatically increases.

An additional object of the invention is to provide a linear motion absorber utilizing a cylinder and piston and formed of a synthetic plastic material wherein the open end of the cylinder is selectively closed and sealed by a synthetic plastic cap having a snap-on fastener for cooperation with the cylinder.

A further object of the invention is to provide a damped linear motion absorber utilizing a cylinder and reciprocal piston wherein the piston and cylinder are formed of synthetic plastic material, and the piston rod element attached to the cylinder comprises a flexible strand, the piston being of sufficient axial dimension to be self-aligning within the cylinder, and the flexible strand permitting misalignment between the forces imposed on the piston rod strand and the axis of the cylinder up to 180° without adversely affecting the operation of the absorber.

SUMMARY OF THE INVENTION

The damped linear motion absorber of the invention is of the expandable chamber type consisting of a cylinder having a closed and open end and a piston located within the cylinder axially reciprocates therein. A removable cap is attached to the cylinder open end to close and seal the same, and an opening is defined in the cap through which the piston rod structure extends. The cylinder, piston, cap and piston rod structure are all formed of a synthetic plastic material which has been molded to the desired configuration, and all of the components of the absorber, except for the compression spring utilized to restore the piston to its retracted position or to effect a damped motion, are formed of a synthetic plastic material.

The use of the synthetic material with the primary components of the absorber eliminates the likelihood of corrosion due to moisture, gases, oil, etc., and as the absorber components may be formed by high production injection molding equipment, the cost of the absorber is significantly reduced from prior absorber constructions.

The piston includes a side wall slightly less in diameter than the cylinder inner diameter and is of sufficient axial length so that the relationship between the piston side wall and cylinder will maintain the piston in a self-aligning arrangement with the axis of the cylinder as the piston moves. Further, the piston is provided with an annular thin lip seal homogeneously formed of the piston material which seals against the cylinder inner diameter producing a fluid tight relationship between the piston and cylinder.

A bleed passage may be formed in the radial web extending between the piston hub and its side wall to permit fluid to pass through the piston during piston movement, and it is also possible to incorporate a bleed passage of a larger diameter having a ball type check valve for lowering back pressure during retraction of the piston.

The piston rod structure may consist of a substantially rigid tubular rod homogeneously molded upon the piston structure axially extending from the piston hub and extending through the cap mounted upon the cylinder end. Alternately, the piston rod structure may consist of a flexible strand extending through the cap, and in such instance the cap may be provided with an exteriorly located guide surface through which the strand extends, the guide surface guides the strand adjacent the cap and serves as a guide bearing for the strand. The guide surface preferably includes a 180° convex form whereby the strand can, if desired, be located adjacent the cylinder. The cap also includes a hole through which the strand snugly passes placing a resistance upon the strand to maintain the strand properly oriented and under tension within the cylinder during piston retraction.

Cylinder mounting tabs are homogeneously formed upon the cylinder during molding, and the cap utilizes resilient fingers which cooperate with locking projections formed upon the cylinder adjacent its open end.

While the piston bleed passage may be formed in the web between the piston hub and side wall, it is also possible to form slits through the piston lip seal adjacent its terminal end whereby fluid may pass through such slits as the piston is extended. The slits will automatically expand in area with respect to fluid flowing therethrough as the differential pressure upon the opposite sides of the piston increases, and the slits will provide an automatic adjustment of the amount of fluid bypassing the piston during absorber operation. The greater the pressure differential, the more the lip seal will be deformed to increase the area of its slits.

BRIEF DESCRIPTION OF THE DRAWINGS.

The aforementioned objects and advantages of the invention will be appreciated from the following description and accompanying drawings wherein:

FIG. 1 is a perspective view of a damped linear motion absorber in accord with the invention, the piston rod being shown in a substantially retracted position, FIG. 2 is a diametrical elevational sectional view of the motion absorber of FIG. 1, FIG. 3 is an enlarged detail elevational sectional view of the piston, FIG. 4 is an enlarged elevational detail view of the cylinder cap and associated structure, FIG. 9 is a perspective elevational view of another embodiment of the linear motion absorber of the invention illustrating the cap released from the cylinder and using a flexible strand as the piston rod structure, FIG. 10 is a diametrical elevational sectional view of the absorber of FIG. 10, fully assembled, utilizing a flexible strand piston rod, FIG. 11 is an elevational diametrical sectional view of another variation of piston structure illustrating a valved control bypass passage within a piston using a strand piston rod, the valve being shown in the closed position, and FIG. 12 is an enlarged detail elevational sectional view of another variation of piston wherein the homogeneous lip seal is defined upon the inner end of the piston to produce sealing during piston retraction.

Figure 5:
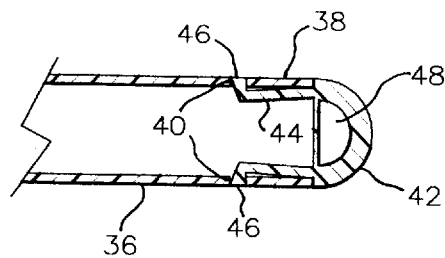
FIG. 5 is an enlarged diametrically sectioned detail view of the end of the tubular piston rod.
Figure 6:
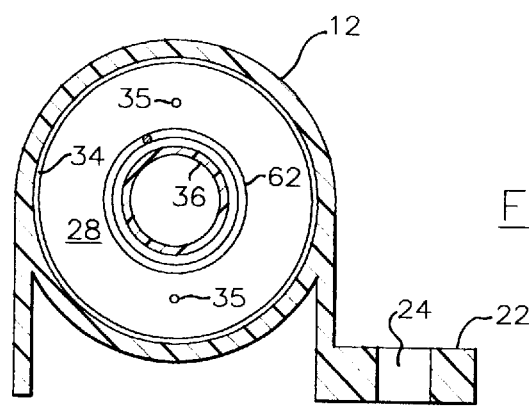
FIG. 6 is an elevational sectional view as taken along Section 6—6 of FIG. 2.

DESCRIPTION OF THE PREFERRED EMBODIMENTS.

As shown in FIG. 1, the damped linear motion absorber of the invention is generally indicated at 10 and basically consists of two components, i.e. a cylinder 12 and a piston 14, FIG. 2. The cylinder 12 includes a permanently closed end 16 and an open end 18 adapted to be closed by a cap, as later apparent. The cylinder inner cylindrical surface is represented at 20, and mounting tabs 22 are molded upon the cylinder body extending therefrom having holes 24 defined therein wherein mounting bolts may mount the absorber 10 as desired.

The piston 14 includes a central hub 26 having a radially extending web which supports the annular side wall 30 which has an outer cylindrical surface of a diameter slightly less than the cylinder inner surface 20. An annular lip seal 32 homogeneously extends from the side wall 30 having an annular sharp edge 34 of minimal thickness wherein the lip seal 32 will be flexible, and as appreciated from FIG. 3, the edge 34 extends radially outwardly further than the surface of the side wall 30. Thus, when the piston 14 is located within the cylinder, the fact that the diameter of the lip seal edge 34 is greater than the diameter of the cylinder inner surface 20 will cause a deflection inwardly of the lip seal 32 producing a firm sealing relationship between the piston and the cylinder.

Bleed passages 35 are defined in the piston web 28 producing communication between the opposite sides of the piston.

In FIGS. 1–8, the piston rod constitutes a tubular stem 36 homogeneously extending from the piston hub 26 and the tubular stem 36 has an outer end 38 in which radial holes 40 are formed, FIG. 5. A cap 42 fits over the stem outer end 38 and resilient fingers 44 formed on the cap 42 include radial extending tips 46 received within the stem holes 40 wherein the cap 42 is firmly affixed upon the stem 36. A hole 48 defined in the cap 42 permits operating structure such as links, pins or the like, not shown, to be attached to the piston rod stem outer end.

The cylinder open end 18 is closed by the cap 50 which mounts upon the cylinder outer end and includes a radial web 52 upon which the inner extending annular apron 54 is mounted. A hole 56 is defined in the cap web 52 of a diameter to slidably receive the piston rod stem 36, and resilient fingers 58 mounted upon the cap include inwardly extending hooks 60 which slip over the annular rib 61 mounted on the cylinder 12 adjacent its open end 18, and in this manner, the cap 50 is firmly attached upon the cylinder open end. The cylinder end 18 is received within the annular recess 63 between apron 54 and the outer cap periphery to seal the interior of the cylinder.

A compression coil spring 62 is located around the stem 36, and a washer 64, FIGS. 2 and 4, slidably mounted upon the stem 36 engages an end of the spring 62. An O-ring 66 is disposed between the washer and the cap web 52 so as to seal the cap hole 56.

In operation, the absorber 10 will be mounted at the desired location by the tabs 22 by fasteners, not shown, extending through the holes 24. The absorber 10 may be used in any application wherein its function is desired, and in particular, the adapter may be employed in the automotive field as a damper to control the opening of glove box doors and the like.

The piston stem 36, through cap 42, is mounted to a pin, linkage, or other mounting structure, not shown, which is relatively movable with respect to the cylinder 12 wherein the opening of a door or the like will pull the piston 14 and stem 36 to the right, FIG. 2. Such movement of the piston 14 will compress the fluid, usually air, on the right side of the piston 14 which will flow through the bleed passages 35 into the void created by the piston movement. Depending on the size of the bleed passages 35, the rate of movement of the piston within the cylinder is regulated due to the closed cylinder circuit, and damping is achieved.

When the forces imposed upon the piston stem 36 are reversed, and the tension on the stem is removed, or the stem 36 is translated to the left, FIG. 2, the compression spring 62 will retract the piston 14 into the cylinder 12 to the position shown in FIG. 2.

Figure 7:
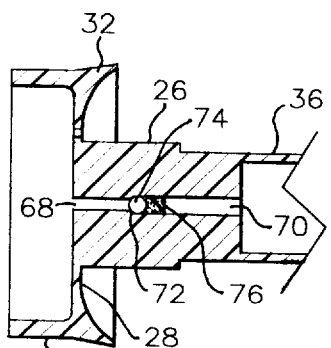
FIG. 7 is an elevational diametrical sectional view of a variation of piston structure illustrating an additional check valve control bypass passage.

If it is desired that the piston 14 move to its retracted position to the left, FIG. 2, under the influence of the spring 62 at a faster rate than would be normal due to the escape of the fluid around the lip seal edge 34, a check valve controlled passage may be located within the piston hub 26, as shown in FIG. 7. In this arrangement, an axial passage 68 is formed in the hub coaxial with a slightly larger axial passage 70 and the junction of these passages defines an annular shoulder or seat 72 against which the check valve ball 74 engages. A small resilient foam block 76 is located within passage 70 so as to resiliently bias the ball 74 into engagement with the seat 72, but upon the pressure on the left side of the piston 14 being greater than the pressure on the right side of the piston, the ball 74 will compress the foam block 76, unseat, and permit additional fluid to bleed through the passages 68 and 70.

Figure 8:
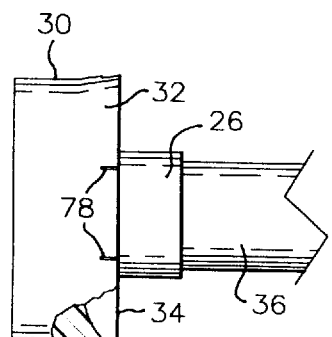
FIG. 8 is an enlarged detail, partially sectioned, elevational view of another embodiment of a piston utilizing slots within the piston lip seal.

FIG. 8 shows another variation of bleed apparatus wherein a plurality of circumferentially spaced slits 78 are defined in the lip seal 32 each intersecting the edge 34. When using the slits 78, the bleed passages through the piston web 35 may be omitted as fluid flow will occur through the slits 78 as the piston and piston rod are extended to the right, FIG. 2. The slits 78 have the characteristic of "opening" if the fluid pressure on the right of the piston 14 is substantially greater than the fluid pressure on the left of the piston due to a high rate of piston movement as the slits 78 will slightly deform to increase their area through which fluid is flowing, and in this manner, the slits 78 will, to an extent, automatically adapt themselves to the conditions under which the linear motion absorber is operating.

All of the linear motion absorber components previously described, except the spring 62, are preferably formed of a synthetic plastic material. For instance, the cylinder 12 could be formed of Acetal such as sold by DuPont under the trademark DELRIN, and the piston 14 can be made from a polyester elastomer such as sold by DuPont under the trademark HYTREL. These components are injection molded with a high degree of accuracy, and their formation of a synthetic material will prevent corrosion, weathering, and inconsistent operating characteristics due to the accumulation of rust or the like, and a lubricant such as TFE (polytetraphotothylene) may be compounded into the material to improve its self-lubricating characteristics. Motion absorbers constructed in accord with the invention have a long effective life of consistent operating characteristics and the injection molded manufacture of the components permits the cost to be low.

A variation in the piston rod structure is shown in FIGS. 9 and 10, and in these figures, components identical to those previously described are indicated by primes.

As will be appreciated from the drawing, the piston 80 located within the cylinder 12' includes a central axially extending hub 82 which includes a web which supports the annular cylindrical side wall 84. The homogeneously formed annular lip seal 86 is sealingly associated with the cylinder inner surface 20'. A bleed passage 88 extends through the piston web, and the hub 82 is provided with an axially extending hole 90.

The cap 92 seals the cylinder open end 18 and includes an outwardly convex web 94 having, at its outer end, an annular notch 95 which receives the end of the cylinder 18' so as to form a sealed relationship thereto. Resilient fingers 96 formed on the cap periphery snap over the annular rib 98 to maintain the cap 92 in position. The outer convex radial surface 100 of the web 94 is of substantially a 180° configuration, and is substantially cylindrical in form, and a central hole 102 is defined in the center hub of the cap which snugly receives the piston rod strand, as later described. The spring 104 is interposed between the cap hub and the piston 80 and biases the piston 80 toward the left, FIG. 10.

A flexible strand 106 is preferably formed of a metal cable or non-stretchable synthetic core, encased within a self-lubricating flexible plastic material such as nylon or the like. The strand 106 extends through the hole 102 in a snug manner as to slide therethrough with slight friction and through piston hole 90 terminating in head 108 engaging piston hub 82.

In operation of the embodiment of FIG. 10, the cylinder 12' will be mounted by the mounting tabs 22' in the usual manner. The outer end of the strand 106 will be attached to the glove compartment door or other element whose movement is to be damped and controlled, not shown. Tensioning of the strand 106 will displace the piston 80 to the right at the speed controlled by the rate of fluid movement through the bleed passage 88, and because the outer diameter of the piston side wall 84 is only slightly less than the diameter of the cylinder inner surface 20', the significant axial length of the piston will maintain the piston coaxial with the cylinder axis as it is displaced through the cylinder. Preferably, the length of the piston side wall 84 is at least two-thirds the diameter of the cylinder inner surface 20'.

The strand 106 passes along the guide surface 100, and the conical configuration of the guide surface will permit that portion of the strand exterior of the absorber to be misaligned with the axis of the cylinder and yet permit proper operation of the absorber. The use of the strand and guide surface will accommodate the absorber to misalignments and permit use of the absorber in a wide variety of applications wherein clearance, size and positioning are limiting factors.

Because of the convex configuration of the cap surface 100, extreme misalignment of the axis of the piston 80 and the exterior configuration of the strand 106 is possible. For instance, as shown in dotted lines in FIG. 10, the strand may be pulled around the cap surface 100 a full 180° as shown in dotted lines at 106' so that the exterior portion of the strand 106' is located along side the cylinder 12'. Because of the self-lubricating aspects of the coating of the strand 106, and the synthetic plastic material construction of the cap 92, the friction between the strand and the cap surface 100 is relatively small and efficient operation of the motion absorber is possible with a wide variation of cylinder mounting and force applications on the flexible strand.

Preferably, the diameter of the cap hole 102 is slightly less than the diameter of the strand 106 wherein a slight frictional resistance exists between the strand 106 and the cap 92 as the strand moves therethrough. This resistance to movement of the strand 106 will maintain the strand in a linear orientation between the cap 92 and the piston 80 as the piston is retracted by the spring 104, and the linear configuration of the strand during retraction prevents the strand from interfering with the operation of the spring, or operation of the piston during extension.

FIG. 11 shows an embodiment of piston construction which may be used with a flexible or rodless absorber wherein a flexible strand is employed instead of a rigid piston rod, and wherein it is desired to increase the air flow through the piston during retraction of the piston, in a manner equivalent to that shown in the piston embodiment of FIG. 7.

With reference to FIG. 11, the piston 110 is molded of a synthetic plastic material having a homogeneous lip seal 112 and a central hub 114. A central hole 116 axially extends through the hub 114 for receiving the strand, as later described. A conical valve seat 118 is defined upon the inner end of the hub 114 for cooperation with a valve member 120 having an inwardly defined conical valve surface 122 complementary to the valve seat 118. A central hole 124 extends through the valve member 120.

The flexible strand 126, which, as previously described with respect to member 106, may consist of a cable encased within a self-lubricating plastic, extends through the piston hole 116 and the valve member hole 124 terminating in an enlarged head 128 received within a recess in the valve member. A compression spring 130 interposed between the web of the piston 110 and the valve member 120 biases the valve member to the left, FIG. 11, tending to separate valve surface 122 from the hub valve seat 118.

In operation, when the strand 126 is tensioned, the valve member 120 will move to the right engaging valve seat 118 and valve surface 122 closing the piston hole 116. It is to be appreciated that the diameter of the piston hole 116 is greater than the diameter of the strand 126 whereby air may flow through the hole 116 when the valve member 120 is separated from the valve seat 118. Engagement of the valve surface 122 and valve seat 118 seals the hole 116 restricting air flow through the piston 110 to the usual bleed hole defined in the piston web. However, during retraction of the piston 110, release of the tension on the strand 126 will permit the spring 130 to separate the valve member 120 from the piston valve seat 118 and separation of the valve surface 122 from the valve seat 118 will permit air on the "exhaust" left side of the piston 110 to flow through the hole 116 thereby reducing resistance of retraction of the piston 110.

A variation of piston construction is also shown in FIG. 12 if it is desired that primary sealing of the motion absorber take place during retraction of the piston wherein primary damping is to occur during piston retraction, rather than piston extension, which is the usual case.

With reference to FIG. 12, the piston 132 includes the hub 134, stem 136, side wall 138 and homogeneous lip seal 140. Air flow through the piston 132 is through the axially extending bleed hole 142 formed in the piston web. It will be appreciated that the piston configuration of FIG. 12 is very similar to that shown in FIG. 3 except that the lip seal 140 is formed on the left end of the piston, rather than on the right end thereof as shown in FIG. 3. With the piston embodiment of FIG. 12, a stronger compression spring, not shown, will be used to retract the piston and the air on the left side of the piston, FIG. 12, becomes the pressurized medium, while the chamber on the right side of the piston becomes the exhaust chamber. The embodiment of FIG. 12 illustrates the universal adaptability of the motion absorber of the invention to a wide range of applications, and of course, if desired, air bleed slits can be formed in the lip seal 140 rather than using the bleed hole 142 similar to that shown in the embodiment of FIG. 8.

It is appreciated that various modifications to the inventive concepts may be apparent to those skilled in the art without departing from the spirit and scope of the invention.

We claim:

1. A damped linear motion absorber comprising, in combination, an elongated cylinder having a closed end, an open end, a cylindrical inner wall, and a longitudinal axis, said cylinder being formed of a synthetic plastic material, a synthetic plastic piston with said cylinder longitudinally displaceable therein, said piston having a longitudinal axis, a cylindrical axially extending side wall, a central hub, exhaust and pressure sides and an annular lip seal engaging said cylinder inner wall which allows unidirectional air flow, said piston side wall being of slightly less diameter than said cylinder inner wall and of sufficient axial length to maintain said cylinder and piston axes coincident and parallel, said lip seal being homogeneously formed of the synthetic plastic material of said piston comprising an annular flexible lip constituting an axial extension of said piston side wall extending in the direction of said piston pressure side and comprising a flexible annular lip of decreasing wall thickness terminating in a sharp edge of lip minimal radial thickness engaging said cylindrical inner wall, tension force transmitting piston rod means attached to said piston extending through said cylinder open end, and a fluid bleed passage defined in said piston establishing communication between said piston sides.

2. In a damped linear motion absorber as in claim 1, a compression spring within said cylinder circumscribing said piston rod means biasing said piston toward said cylinder closed end.

3. In a damped linear motion absorber as in claim 1, a removable cap enclosing said cylinder open end, said piston rod means extending through said cap.

4. In a damped linear motion absorber as in claim 1, said piston including a radial web interconnecting said piston side wall to said piston hub, said fluid bleed passage being located within said web.

5. In a damped linear motion absorber as in claim 1, said fluid bleed passage comprising at least one slit defined in said lip seal.

6. In a damped linear motion absorber as in claim 5, said lip seal including a thin outer annular edge, said fluid bleed passage comprising at least one slit defined in said lip seal intersecting said outer annular edge.

7. In a damped linear motion absorber as in claim 4, a flow passage defined in said piston hub in communication with said piston sides, and a check valve within said flow passage permitting unidirectional fluid flow in said flow passage from said piston exhaust side to said pressure side.

8. In a damped linear motion absorber as in claim 1, said piston rod means comprising a tubular synthetic plastic substantially rigid stem having an inner end mounted on said piston hub and an outer end extending through said cylinder open end.

9. In a damped linear motion absorber as in claim 8, said stem being homogeneously formed with said piston hub.

10. In a damped linear motion absorber as in claim 8, a spring within said cylinder biasing said piston toward said cylinder closed end, said piston rod means comprising a flexible strand having an inner end attached to said piston hub and an outer end extending through said cylinder open end.

11. In a damped linear motion absorber as in claim 10, a removable cap mounted upon and enclosing said cylinder open end, said cap including a central web extending across said cylinder open end having inner and outer surfaces, an opening defined in said cap web, said strand extending through said cap opening, and a strand guide mounted on said cap outer surface adjacent said opening.

12. In a damped linear motion absorber as in claim 11, said opening frictionally engaging said strand to resist strand movement therethrough.

13. In a damped linear motion absorber as in claim 11, said strand guide including a convex arcuate surface disposed adjacent said cap opening whereby said strand may engage said convex surface permitting the exterior portion of said strand to be misaligned with respect to the axis of the cylinder.

14. In a damped linear motion absorber as in claim 13, said convex guide surface being of a substantially 180° configuration permitting the linear motion absorber to be operative when the direction of tension on the exterior portion of the strand is substantially opposite to the direction of movement of the piston within the cylinder.

15. In a damped linear motion absorber as in claim 11, a central bleed opening defined within the piston hub, an angular valve seat defined upon the piston hub circumscribing the hub bleed opening, a valve member having a valve surface complementary to said valve seat disposed adjacent the piston hub, said strand extending through said piston bleed hole and said valve member wherein tension upon said strand engages said valve member with said hub valve seat to close said bleed opening, and a spring interposed between said piston and said valve member tending to disengage said valve member and valve seat.

16. In a damped linear motion absorber as in claim 1, the pressure side of said piston being disposed toward the cylinder closed end, and said lip seal being defined on said piston side wall portion closest to the cylinder closed end.

17. A damped linear motion absorber comprising, in combination, an elongated cylinder having a closed end, an open end, a cylindrical inner wall, and a longitudinal axis, a piston within said cylinder formed of a synthetic plastic material longitudinally displaceable therein, said piston having a longitudinal axis, a cylindrical axially extending side wall, a central hub, exhaust and pressure sides and an annular lip seal engaging said cylinder inner wall, said lip seal being homogeneously formed of the synthetic plastic material of said piston comprising an annular flexible lip constituting an axial extension of said piston side wall extending in the direction of said piston pressure side and comprising a flexible annular lip of decreasing wall thickness terminating in a sharp edge of lip minimal radial thickness engaging said cylindrical inner wall, said piston side wall being of slightly less diameter than said cylinder inner wall and of sufficient axial length to maintain said cylinder and piston axes coincident and parallel, the length of said piston side wall being at least two-thirds of the diameter of said cylinder inner wall, a flexible tension force transmitting strand attached to said piston extending through said cylinder open end, and a fluid bleed passage defined in said piston establishing communication between said piston sides.

18. In a damped linear motion absorber as in claim 17, a removable cap mounted upon and enclosing said cylinder open end, said cap including a central web extending across said cylinder open end having inner and outer surfaces, an opening defined in said cap web, said strand extending through said cap opening, and a strand guide mounted on said cap outer surface adjacent said opening, said strand extending through said guide.

19. In a damped linear motion absorber as in claim 18, said strand guide mounted on said cap outer surface comprising a convex arcuate surface engaging said strand upon misalignment of the exterior portion of said strand with respect to the axis of said cylinder permitting the linear motion absorber to be operative regardless of the alignment of the exterior portion of said strand and the axis of said cylinder.

\* \* \* \* \*